(12) United States Patent
Moro et al.

(10) Patent No.: US 6,287,189 B1
(45) Date of Patent: Sep. 11, 2001

(54) APPARATUS FOR CUTTING SAUSAGE LINKS

(75) Inventors: Joseph Moro; William Southworth, both of Sheboygan Falls; Richard Thomas, Elkhart Lake, all of WI (US)

(73) Assignee: Johnsonville Foods Company, Sheboygan Falls, WI (US)

( * ) Notice: Subject to any disclaimer, the term of this patent is extended or adjusted under 35 U.S.C. 154(b) by 0 days.

(21) Appl. No.: 09/328,274

(22) Filed: Jun. 8, 1999

Related U.S. Application Data

(60) Provisional application No. 60/088,533, filed on Jun. 8, 1998.

(51) Int. Cl.$^7$ .................................................. A22C 11/00
(52) U.S. Cl. ............................. 452/49; 452/51; 83/569; 83/639.1; 83/648; 83/932
(58) Field of Search .................. 452/49, 51, 118; 425/289, 301, 306; 83/32, 49, 52, 932, 566, 567, 569, 636, 639.1, 648, 694, 175

(56) References Cited

U.S. PATENT DOCUMENTS

| | | | |
|---|---|---|---|
| 2,503,353 | * | 4/1950 | Pugh .................................. 83/175 X |
| 2,670,498 | * | 3/1954 | Mosby ............................... 452/49 X |
| 3,716,891 | * | 2/1973 | Demarest .......................... 452/49 X |
| 4,060,875 | * | 12/1977 | Gosling et al. .................... 452/49 X |
| 4,194,268 | * | 3/1980 | Deerwester ........................... 452/49 |
| 4,214,492 | * | 7/1980 | Hoffman ........................... 452/49 X |
| 4,233,709 | * | 11/1980 | Smith et al. .......................... 452/49 |
| 4,584,740 | * | 4/1986 | Townsend ......................... 452/49 X |
| 4,671,042 | * | 6/1987 | Moekle et al. .................... 452/49 X |
| 5,156,566 | * | 10/1992 | Righele ............................. 452/49 X |
| 5,377,570 | * | 1/1995 | Giljam ................................. 83/175 |

* cited by examiner

Primary Examiner—Rinaldi I. Rada
Assistant Examiner—Charles Goodman
(74) Attorney, Agent, or Firm—Michael Best & Friedrich LLP

(57) ABSTRACT

A link cutting apparatus for cutting a twist between two links. The apparatus includes a link aligning device and a trimming device. The link aligning device is movable between a disengaged position and an engaged position where the device will engage a link and align the twist with the cutting device. In one embodiment, the link aligning device includes a link aligning member pivotable between the engaged and disengaged positions. Preferably, the apparatus further includes a second link aligning device that will engage a second link and align a second twist with a cutting device. The trimming device includes at least two cutting edges that will remove at least a portion of the twist from both of the links. In one embodiment, the cutting edges comprise at least two knives and at least one blade sized to fit between the knives. Preferably, the apparatus further includes a second trimming device having at least two cutting edges that will remove at least a portion of a second twist from a second pair of links.

6 Claims, 5 Drawing Sheets

APPARATUS FOR CUTTING SAUSAGE LINKS

This application claims benefit of provisional application No. 60/088,533, filed Jun. 8, 1998.

FIELD OF THE INVENTION

The present invention relates generally to the field of food processing, and more particularly to the field of sausage processing.

BACKGROUND OF THE INVENTION

In the processing of meat into sausage links, ground meat, fat, and spices are mixed and extruded into either collagen or natural casing. The sausage is then divided into individual sausage links by twisting the casing at selected intervals. This process creates a twist in the casing between each sausage link.

In one known process, the string of sausage links is then placed on a rolling rack for transport for further processing such as cooking or smoking. Referring to FIGS. 1 and 2, an example of such a rack is a mobile rack 10 comprising a series of bars 11 having a triangular surface. The links 12 are preferably wound or looped around the bars in a helical fashion. In the illustrated embodiment, each loop includes four links so that within each loop two links 12 hang on either side of the bar 11.

Sausage links processed using the above-described rack typically have two types of ends. Referring to FIG. 2, one end may be described as a cobra head end 13. This type of end results when the normally rounded end of the link has been flattened on the triangular surface of the bar. Stretching of the twist 14 also occurs with this type of end, creating twists of varying lengths. According to the process described above, a pair of cobra head ends 13 is formed once every four links. The other type of end is called a round end 15.

After smoking, cooking, cool-down or other processing, the links are transported on the rolling rack 10 to a separating area. Here, the links 12 are separated from one another by cutting the twist 14 (e.g., with a knife or scissors). When the twist 14 is cut, a small portion of the twist typically stays attached to one or both ends of the corresponding links 12. With short twists, this is normally not a problem. However, with twists that have been stretched (e.g., due to the weight of the suspended links), the twist can be significant in length. Such long twists can have a tough texture, particularly if they are collagen.

In light of this problem, it is known to remove a substantial portion of the twist by trimming on both ends of the twist, thereby resulting in an improved product. This process was previously performed manually by workers using scissors. This process can be a problem in the industry due to low efficiency and also due to the repetitive nature of the process.

SUMMARY OF THE INVENTION

It can be appreciated that an automated apparatus for cutting and trimming links is desirable. However, the design of such an apparatus is compounded by several problems. First, the length of the links may vary by about ¼ to ⅜ inch. Second, the length of the twist of each link may vary by about ¼ to ⅜ inch. The variation in link length and twist length is in part due do to the formation of cobra head ends. What is needed is a machine that can cut links with varying body length, twist length and head type.

The present invention provides a link cutting apparatus for cutting a twist between two links. The apparatus includes a link aligning device and a cutting device. The link aligning device is movable between a disengaged position and an engaged position where the device will engage a link and align the twist with the cutting device. In one embodiment, the link aligning device includes a link aligning member pivotable between the engaged and disengaged positions. Preferably, the apparatus further includes a second link aligning device that will engage a second link and align a second twist with a cutting device.

The present invention also provides a link cutting apparatus including a trimming device having at least two cutting edges that will remove at least a portion of the twist from both of the links. In one embodiment, the cutting edges comprise at least two knives and at least one blade sized to fit between the knives. For example, the blade can be pivotally mounted relative to the knives. Preferably, the apparatus further includes a second trimming device having at least two cutting edges that will remove at least a portion of a second twist from a second pair of links.

BRIEF DESCRIPTION OF THE DRAWINGS

FIG. 7 is a cross-sectional view taken along line 5—5 of FIG. 4 after the terminal links are separated.

DETAILED DESCRIPTION OF THE ILLUSTRATED EMBODIMENT

Figure 1:
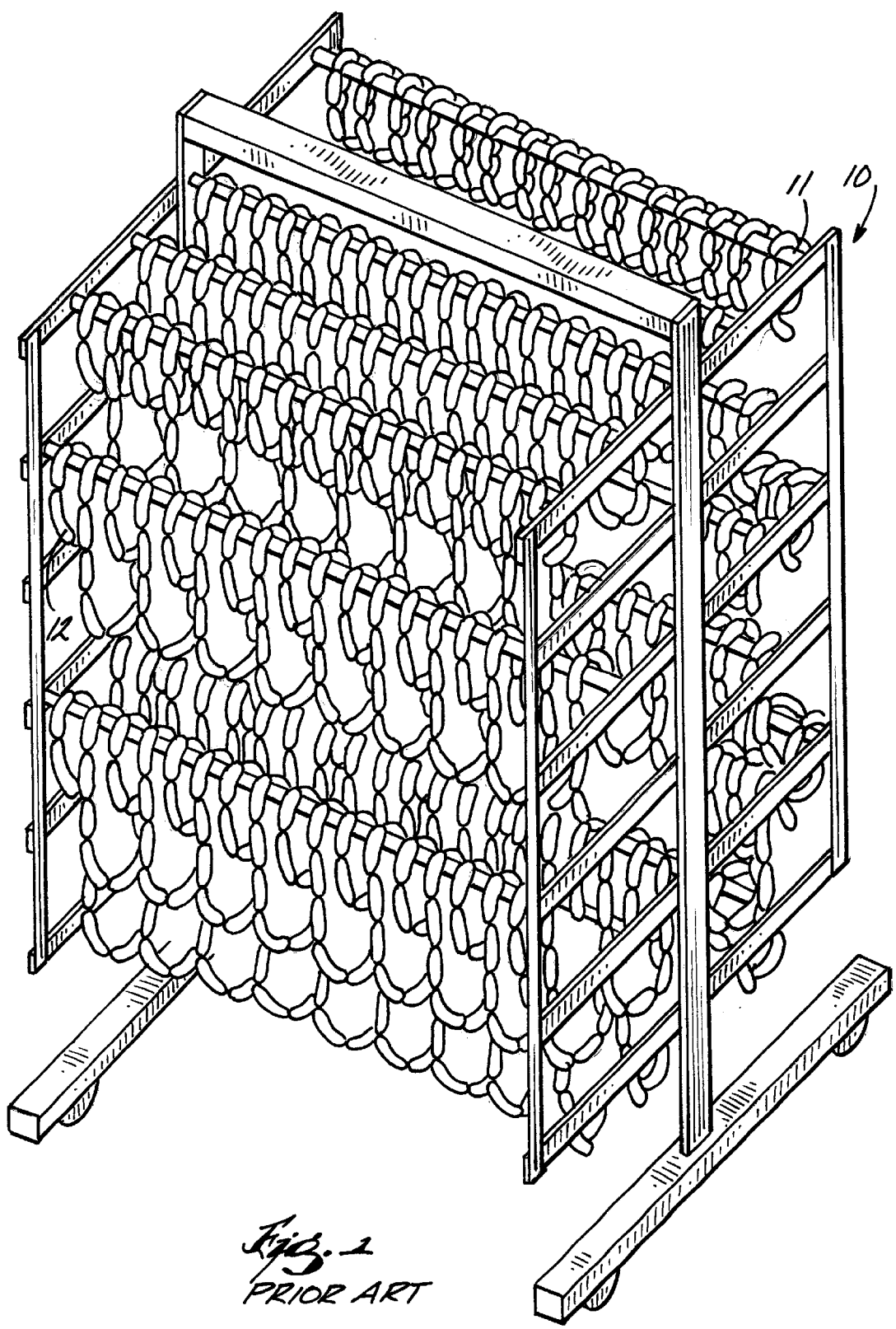
FIG. 1 is a perspective view of a mobile rack for hanging links.
Figure 1:
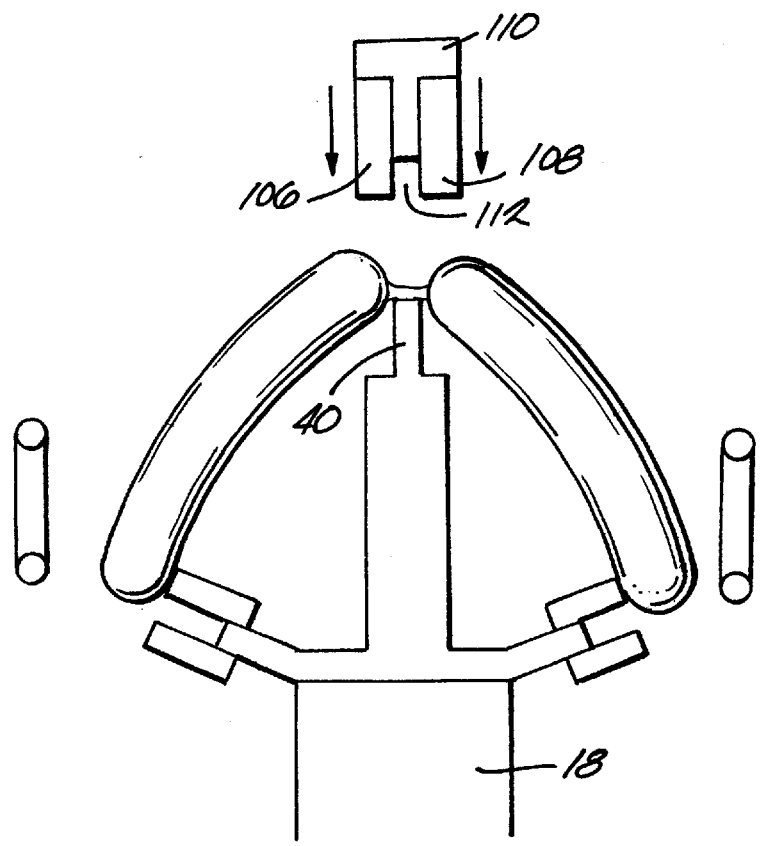

An apparatus 16 for trimming sausage links and embodying the present invention is illustrated in FIGS. 3–7. The apparatus 16 generally includes a rolling base 17 having a central Support member 18, a pair of side support members 19,20, and an upper support member 21. The apparatus 16 further includes a front wall 22, a middle wall 24, and a rear wall 26, each of which extends upwardly from the support members 19,20. The front wall 22, middle wall 24, and rear wall 26 divide the apparatus 16 into a product guide portion 28, a product trimming portion 30, and a product loading portion 32. A guide cover 33 provides a cover for the guide portion 28, and a trimming cover 34 provides a cover for the trimming portion 30. Hinges 35 allow access to the guide portion 28 and the trimming portion 30. Transparent windows 37 in the trimming cover provide visual access to the trimming portion 30.

The apparatus 16 further includes a transport mechanism for conveying the links from the loading portion 32 to the trimming portion 30. The transport mechanism includes a link support in the form of a carrier plate 36 on which the links are hung for trimming, and a carrier plate guide 38. The carrier plate 36 is slidable relative to the carrier plate guide 38 so that the carrier plate 36 may be extended outwardly from the apparatus and so that links may be loaded onto the carrier plate 36 at the loading portion 32. A central blade 40 having an upper surface 42 is fixed to the carrier plate 36. The transport mechanism further includes a guide channel 44 parallel to the central support member 18. The guide channel 44 is designed to receive the central blade 40.

The transport mechanism also includes a pneumatic actuator for sliding the carrier plate 36 into and out of the trimming portion 30. The pneumatic actuator includes a transport cylinder 50 and a transport rod 52. The transport rod 52 is coupled to the carrier plate 36 so that when pneumatic pressure is applied through the cylinder 50, the carrier plate 36 is extended or retracted.

Figure 2:
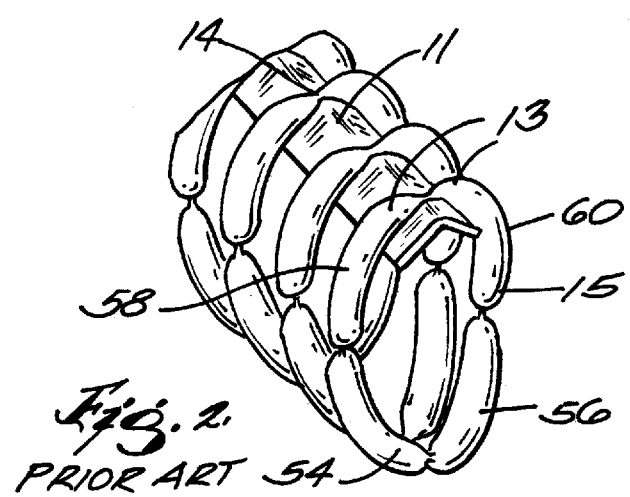
FIG. 2 is an enlarged perspective of a single bar with links.
Figure 3:
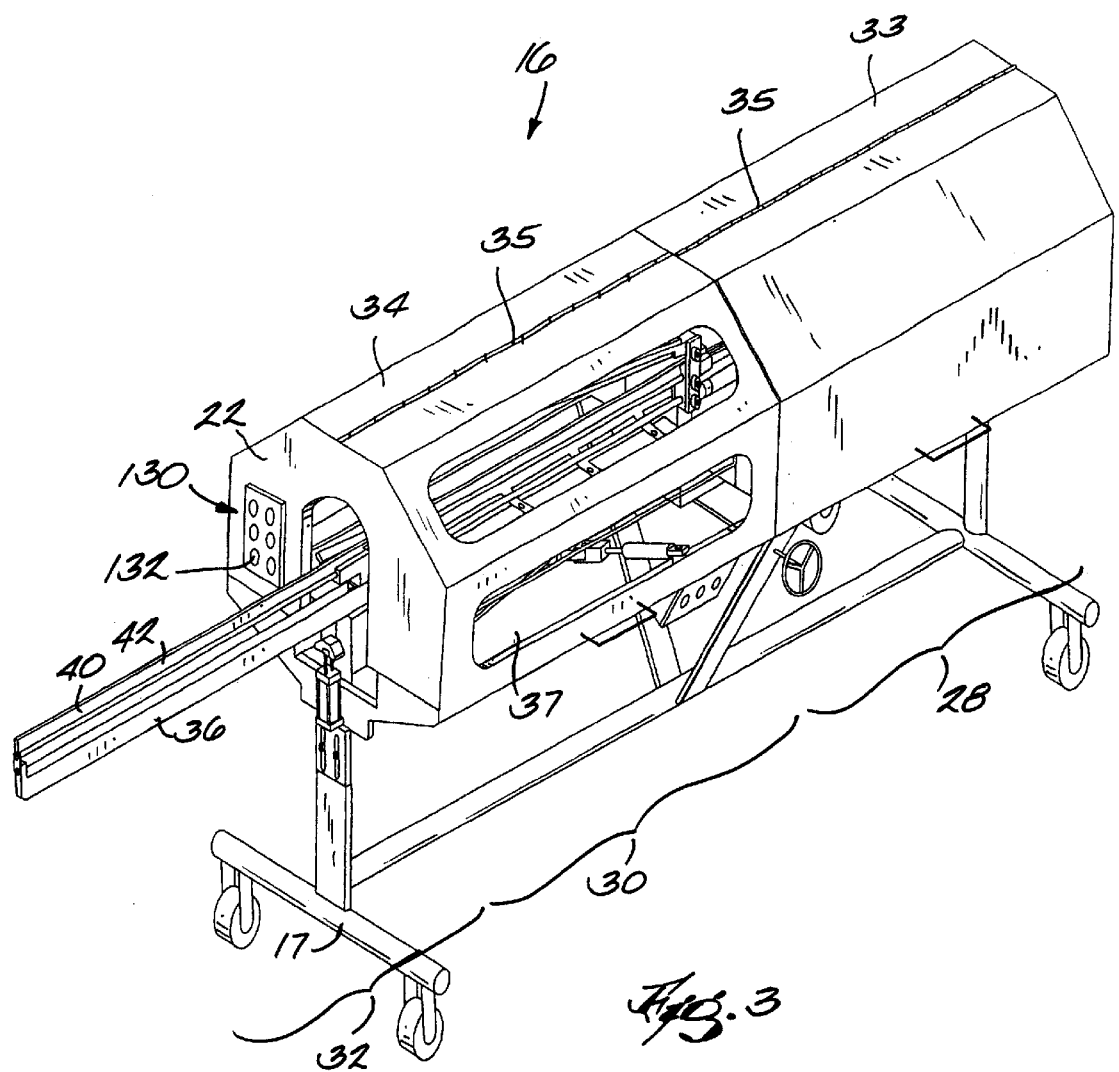
FIG. 3 is a perspective view of a twist trimming apparatus embodying the present invention.
Figure 5:
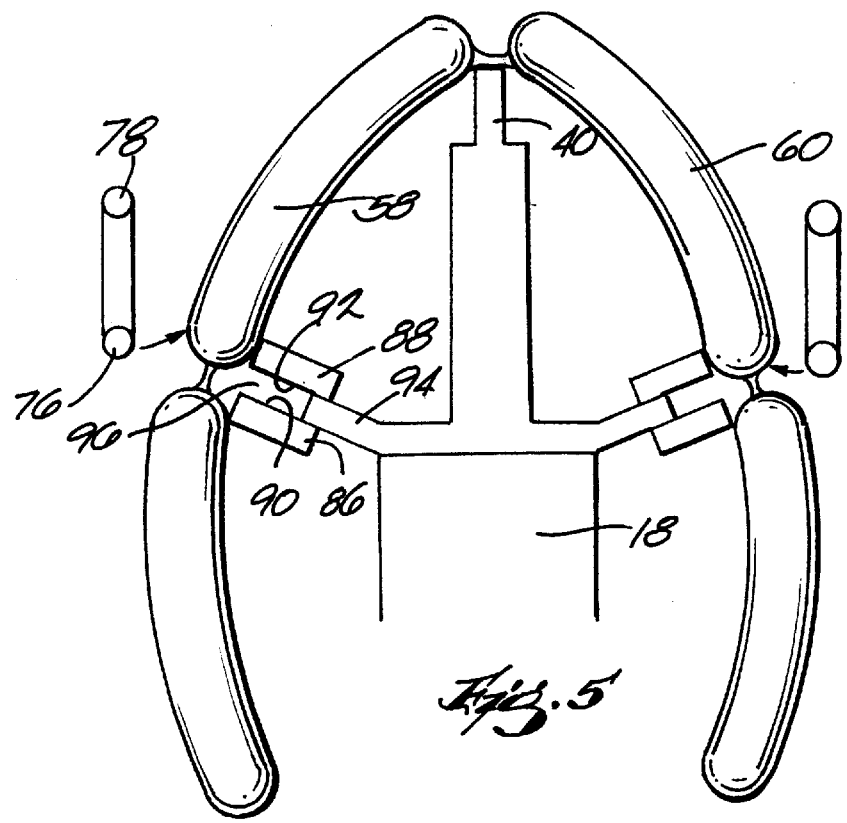
FIG. 5 is a cross-sectional view taken along line 5—5 of FIG. 4 before the links are aligned with the cutters.

In operation, a long string of links is manually divided into chains having four links each. Referring to FIG. 2, the first 54 and last 56 links in each chain are herein referred to as terminal links while the second 58 and third 60 links are herein referred to as interior links. The chains are draped over the carrier plate 36 in the product loading portion 32 so that the cobra head ends 13 are in contact with the upper surface 42 of the central blade 40 and two links hang on either side of the carrier plate 36, as shown in FIG. 5. In this embodiment, the central knife acts as a link support. By actuation of the transport mechanism, the links can then be transported to the product trimming portion 30.

The apparatus 16 further includes cutting devices in the form of side trimming devices that remove the twist between the terminal links 54,56 and the corresponding interior links 58,60. The side trimming devices are substantially similar to one another, so only one will be described in detail. The side trimming device includes a pair of side knives 86,88, each having an inner cutting surface 90,92 (FIG. 5). The side knives 86,88 are fixed to an extension 94 that extends from the central support member 18 so that a gap 96 of substantially constant width exists between the inner cutting surfaces 90,92 (FIG. 5). The side trimming device also includes a rectangular side blade 98 pivotally mounted relative to the side knives 86,88. The width of the side blade 98 is substantially similar to the width of the gap 96 between fixed side knives 86,88 so that the side blade 98 is insertable into the gap 96. When the side blade 98 is inserted into the gap 96, the inner cutting surfaces 90,92 of the fixed side knives 86,88 and the outer surfaces of the side blade 98 are brought into contact.

The side trimming device also includes a side blade actuator in the form of a pneumatic cylinder 102 and a rod 104. The rod 104 is coupled to the side blade 98 so that pneumatic force applied through the cylinder 102 causes the side blade 98 to pivot toward the side knives 86,88. As the side blade 98 is pivoted, the side blade 98 is inserted into the gap 96 between the side knives 86,88 so that the twist between the links is removed.

The apparatus 16 also includes a cutting device in the form of an upper trimming device that removes the twist between the interior links 58,60. The upper trimming device includes top knives 106,108 fixed to each side of a top knife body 110. The width of the central blade 40 is substantially similar to the width of a gap 112 between the top knives 106,108 so that the central blade 40 is insertable in the gap 112 (FIG. 7). When the central blade 40 is inserted into the gap 112, the top knives are brought into contact with the twist and the central blade 40, resulting in removal of the twists from between the interior links. The top knife body 110 is pivotally mounted to a top bracket 114, which is secured to the support member 21.

The upper trimming device also includes a top pivoting actuator. The top pivoting actuator includes a pneumatic cylinder I 18 and a rod 120. The rod 120 is connected to the top knife body 110 so that pneumatic force applied through the cylinder 118 causes the top knife body 110 to pivot. As the top knife body 110 is pivoted downward by the top pivoting actuator, the central blade 40 is inserted into the gap 112 between the top knives 106,108.

Figure 4:
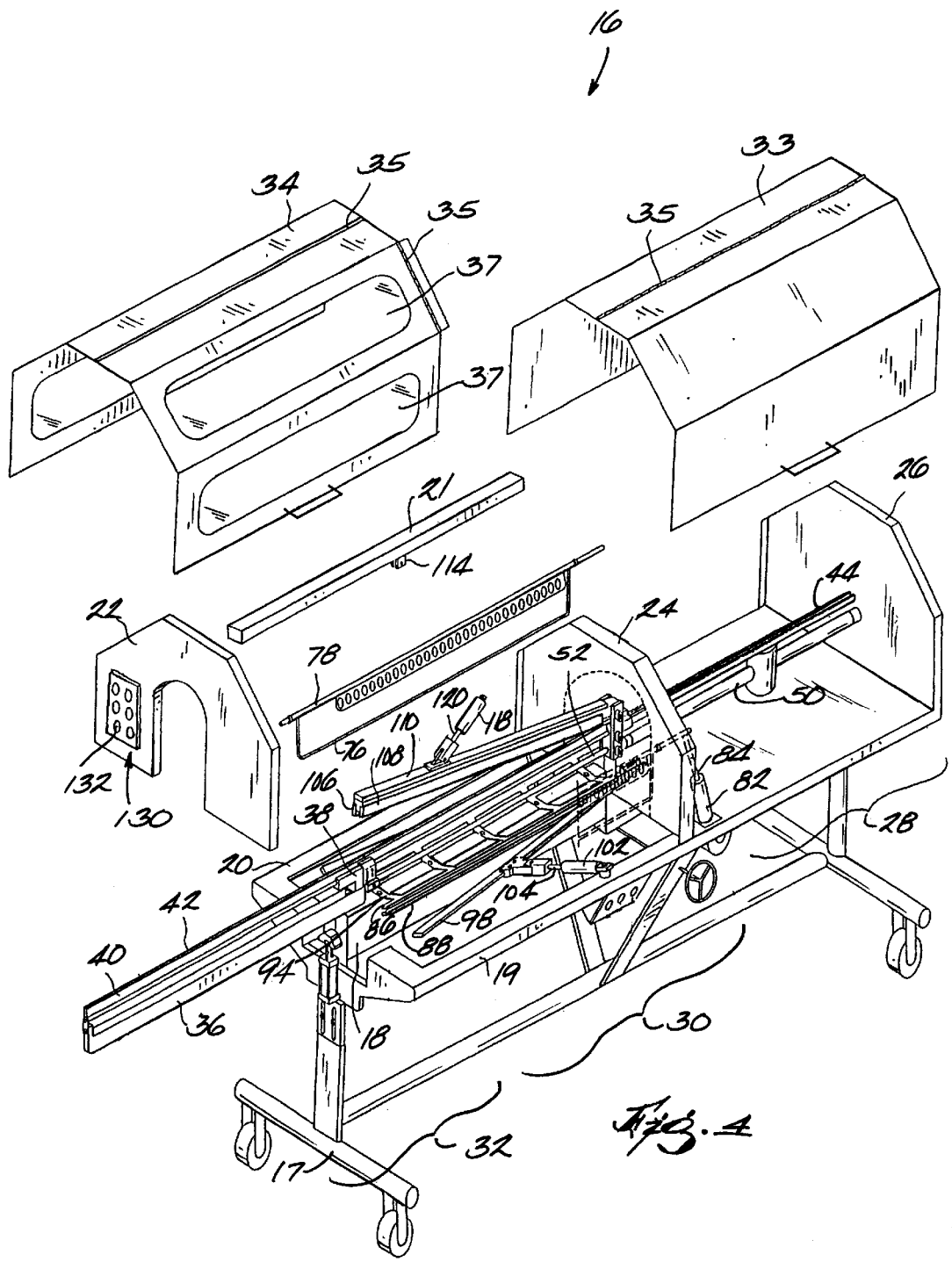
FIG. 4 is an exploded view of the twist trimming apparatus of FIG. 3.
Figure 6:
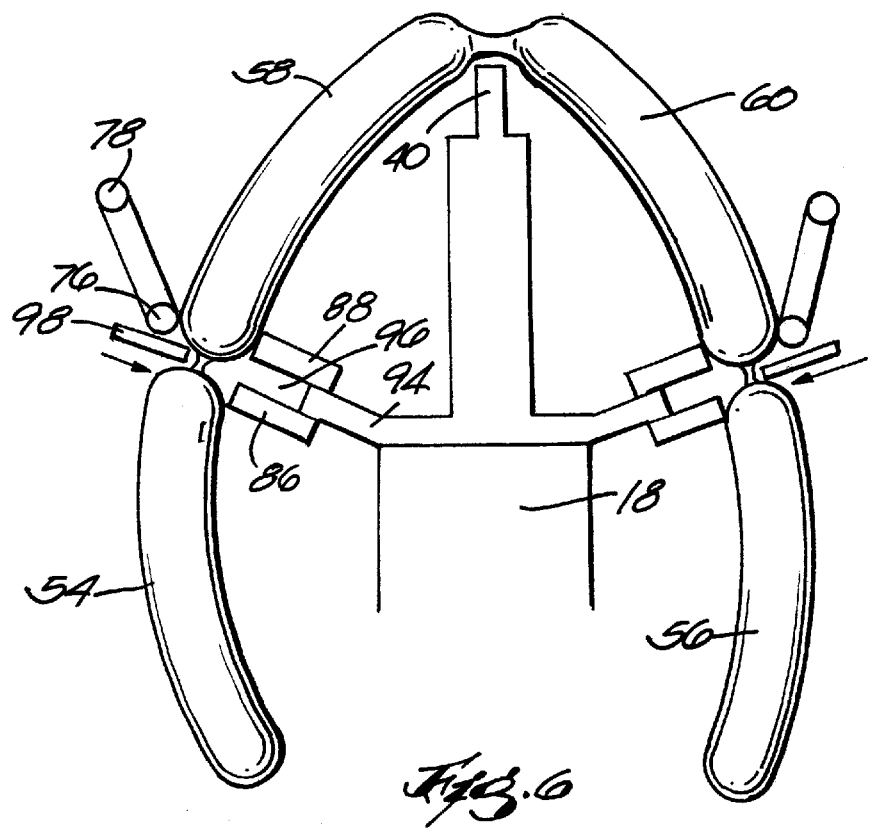
FIG. 6 is a cross-sectional view taken along line 5—5 of FIG. 4 with the link aligning mechanism engaging the links.

As shown in FIG. 5, due to varying twist and link length, the twists between the interior links 58,60 and the terminal links 54,56 are often not in substantial alignment with the side trimming devices. In this regard, the illustrated embodiment includes a pair of link aligning devices for aligning the links prior to actuating the side trimming devices. The link aligning devices are substantially similar to one another, so only one will be described in detail. The link aligning device includes a link aligning member 76 coupled to an aligning shaft 78 pivotally attached to the front and middle walls 22,24 so that it is pivotable about a horizontal axis between a disengaged position (FIG. 5) and an engaged position (FIG. 6). The link aligning device further includes a pivoting actuator for pivoting the link aligning member 76. The illustrated pivoting actuator includes a pneumatic cylinder 82 having an output rod 84 connected to the link aligning member 76 (FIG. 4).

In operation of the link aligning devices, pneumatic pressure is applied through the pneumatic cylinder 82 causing the link aligning member 76 to pivot inwardly from a disengaged position (FIG. 5) to an engaged position (FIG. 6). As shown in FIGS. 5 and 6, the link aligning member 76 contacts and lifts the interior links 58, 60, bringing the twists into substantial alignment with the side trimming devices so that the twists may be trimmed without cutting the links. In this embodiment, the side knives 86,88 act as a link support.

The sequence of steps for trimming the link twists is as follows. Multiple loops of four links are hung on the central blade 40 in the product loading portion 32 so that two links of each loop are on either side of the carrier plate 36, as described above (FIG. 5). The carrier plate 36 and links are then drawn into the product trimming portion 30 by operation of the transport mechanism. Next, the link aligning devices are activated to align the links for twist trimming. The link aligning members 76 pivot simultaneously, moving the links to an aligned position (FIG. 6). If the interior links 58,60 are too long, actuation of the aligning devices will result in the links being lifted from the central blade 40. The side trimming devices are then activated simultaneously so that the side trimming blades 98 pivot and are inserted into the gap 96 between the fixed side knives 86, 88. This results in removal of the twists and separation of the terminal links 54, 56. Next, the link aligning devices are deactivated and the upper trimming device is activated. The top knife body 110 pivots, causing insertion of the central blade 40 into the gap 112 between the top knives 106,108. This results in removal of the twist between the two interior links 58,60 and allows the interior links 58,60 to separate. The transport mechanism can then be actuated to move the central blade 40 back to the product loading portion 32.

After separation, the links fall onto a product conveyor (not shown) positioned below the trimming portion 30.

Each of the above-described operations can be programmed into a controller 130 such that the entire sequence of operations can be performed sequentially by the push of a single button 132.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A link cutting apparatus for cutting a twist between two links, said apparatus comprising:
   a base;
   a link support having at least two cutting edges mounted to said base; a plurality of links having a plurality of twists connecting the links, wherein said plurality of links are supported by said link support for a subsequent cutting operation; and
   at least one trimming device positioned adjacent said link support and having at least two cutting edges that will cooperate with said cutting edges of said link support to remove at least a portion of the twists from the links, wherein said trimming device is pivotally coupled to said base, and wherein said plurality of twists are cut with a single cutting movement of a single trimming device.

2. A link cutting apparatus as claimed in claim 1, wherein said link support comprises at least two knives and said trimming device comprises at least one blade sized to fit between said knives.

3. A link cutting apparatus as claimed in claim 2, wherein said knives are coupled to said base.

4. A link cutting apparatus as claimed in claim 3, wherein said blade is movably coupled to said base.

5. A link cutting apparatus as claimed in claim 1, further comprising:
   a second link support having at least two cutting edges mounted to said base, a second plurality of links having a second plurality of twists connecting the second plurality of links, wherein said second plurality of links are supported by said link support for a subsequent cutting operation; and
   a second trimming device positioned adjacent said second link support and having at least two cutting edges that will cooperate with said cutting edges of said second link support to remove at least a portion of the second twists from said second links.

6. A link cutting apparatus as claimed in claim 5, wherein said apparatus is programmed to actuate both of said trimming devices substantially simultaneously.

* * * * *